Dec. 7, 1954  J. H. VAN DER VEER  2,696,579
MOTOR CONTROL SYSTEM FOR DOOR OPERATION
Filed Nov. 4, 1948  3 Sheets-Sheet 1

INVENTOR.
John H. Vander Veer
BY
Martin J. Finnegan
ATTORNEY

INVENTOR.
JOHN H. VANDERVEER
BY Martin J. Finnegan
ATTORNEY

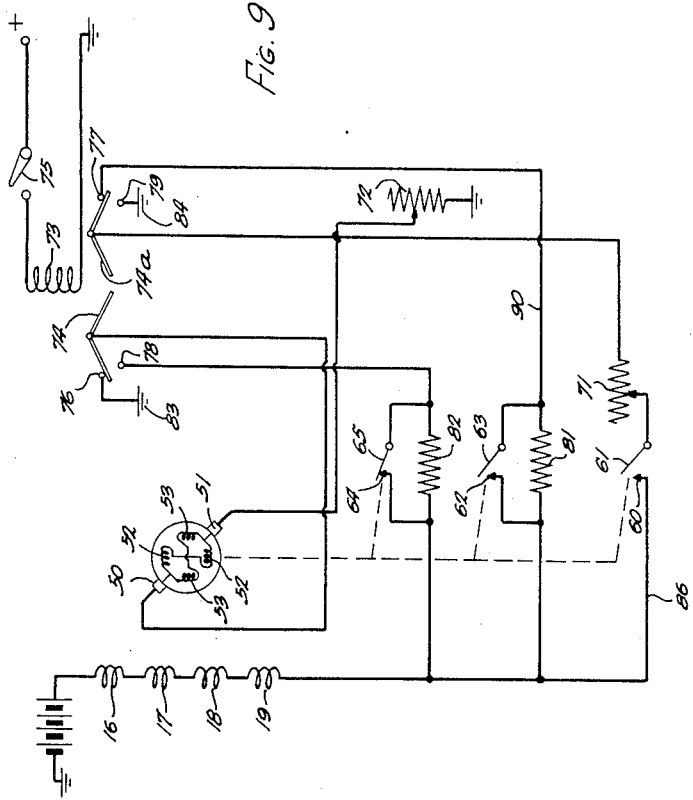
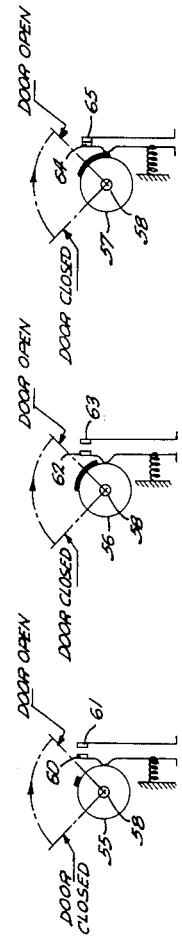
Fig. 9, Fig. 10, Fig. 11, Fig. 12, Fig. 13

United States Patent Office 2,696,579
Patented Dec. 7, 1954

2,696,579

MOTOR CONTROL SYSTEM FOR DOOR OPERATION

John H. Van der Veer, Westfield, N. J., assignor, by mesne assignments, to National Pneumatic Co., Inc., Boston, Mass., a corporation of Delaware Application November 4, 1948, Serial No. 58,173

8 Claims. (Cl. 318—250)

This invention relates to the operation and control of doors, particularly the doors of railway cars, buses, or other transportation facilities.

An object of the invention is to provide novel electrically powered means for opening, closing, and holding one or more doors in either open or closed position.

A second object is to provide novel motion converting connections between an electric motor and a door to render the latter positively responsive to the rotation of the motor armature, in unison with manually induced movement of the door, if such manual operation becomes necessary.

A third object is to provide a motor assembled from a novel combination of electrical and electromagnetic elements, interrelated in such a way as to produce relatively high torque capacity at speeds that are extremely low, thereby rendering unnecessary the use of extensive speed reduction gearing between the motor and the door (or doors) to be operated, and at the same time assuring development of adequate power to produce prompt commencement of movement of the door at the beginning of each cycle. In this connection a feature of the electrical construction of the motor is the distribution of the torque producing current between the armature and field windings in a novel manner assuring adequate operating power during door movements, and also adequate holding power at each extreme position of the door, yet without excessive current consumption or overheating, even over periods of continued energization.

A fourth object is to provide novel control circuits for varying the proportions of currents supplied to the motor windings as one stage of the cycle of operation is completed, and the following stage is begun. In this connection, a feature of the control is the automatic reduction of the current supply to the motor armature as the direction of current flow is reversed; this operation serving to produce a slower closing movement of the door as compared with the opening speed. A slower closing is desirable as a safeguard against injury to a person remaining in the door's path as it is closing, whereas a much faster operation is desirable on the opening portion of the cycle, to accelerate the loading and unloading of the vehicle. The novel control circuits of this invention make it possible to achieve a maximum flexibility in this matter of speed variations with a minimum of current consumption during intervals between successive door movements.

A fifth object of the invention is to provide novel means for lubricating the motor transmitting connections between the motor and the door, including in such novel means an arrangement in the form of a wick element reciprocable with the motion transmitting connections, said wick element being arranged to straddle an inwardly projecting rail by which the reciprocating assembly is guided and constrained as it moves from one extreme position to the other.

A sixth object is to provide novel means for converting rectilinear motion of the reciprocating assembly, above to be operated, the conversion being such as to cause said door, or doors, to swing about a constantly moving pivot point, or points, to maintain maximum clearance of the passage-way throughout the movement.

These and other objects will be better understood upon reference to the following description of one embodiment of the invention, as illustrated in the accompanying drawings wherein:

Fig. 1 is a longitudinal sectional view of a motor embodying the invention.

Figs. 2, 3 and 4 are transverse sectional views along lines 2—2, 3—3 and 4—4, respectively.

Fig. 9 is a diagram of electrical connections.

Figs. 10, 11 and 12 show three switches and operating cams therefor, these being component parts of an assembly illustrated in Figs. 5 and 7; and Fig. 13 is a chart of switch contact positions.

Figure 1:
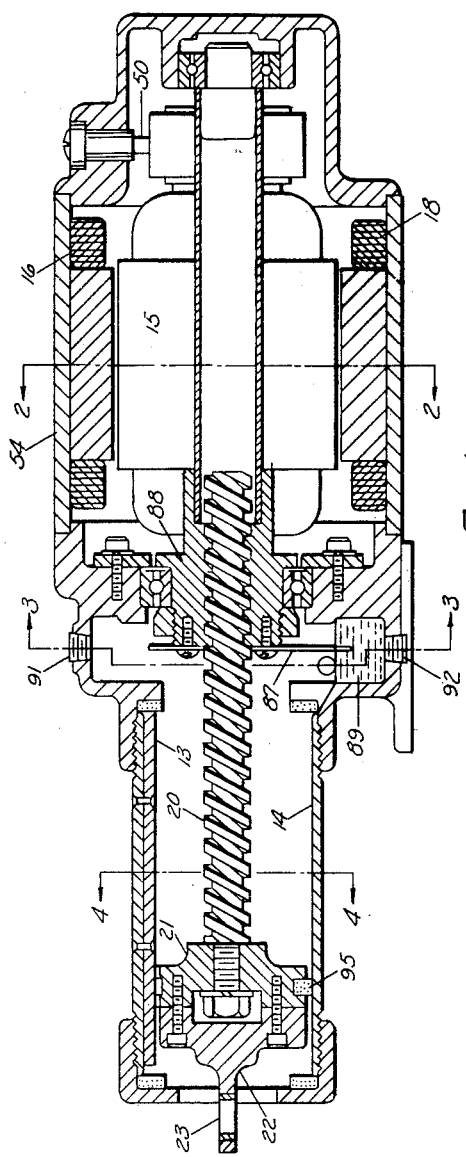
Figure 2:
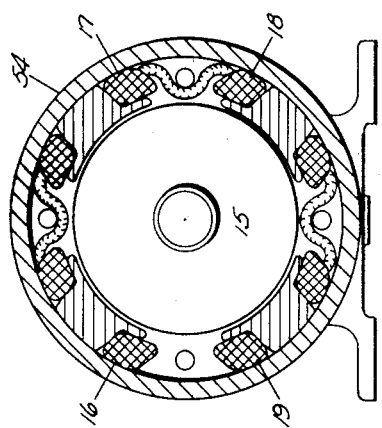
Figure 3:
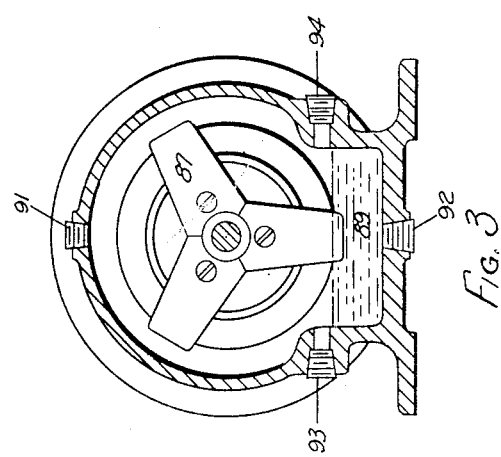
Figure 4:
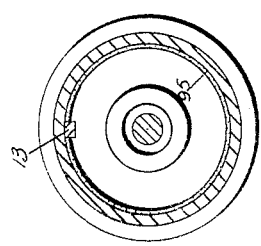
Figure 5:
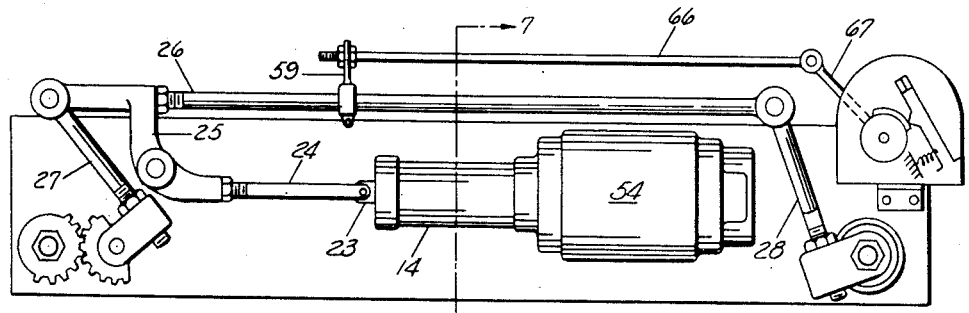
Fig. 5 is a top plan view of the motor of Fig. 1 showing operating connections from said motor to two vertically disposed door operating shafts, at opposite sides of a passage-way.
Figure 6:
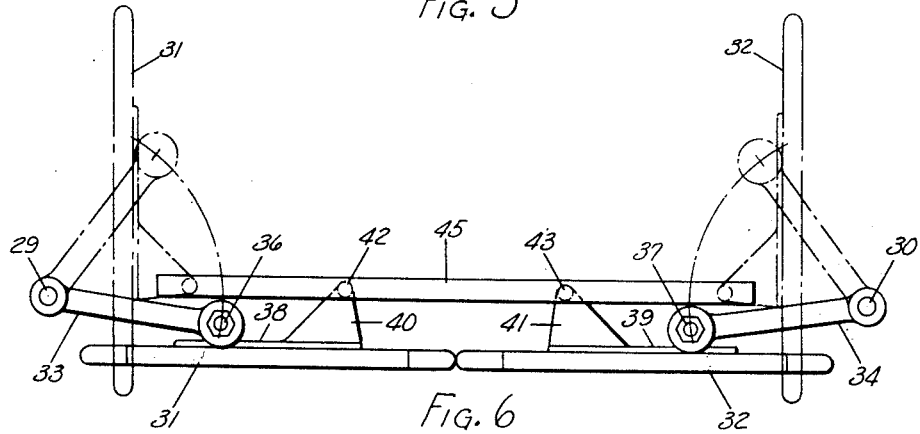
Fig. 6 shows the operating connections from said two shafts to two complementary doors to be operated thereby.
Figures 7, 8:
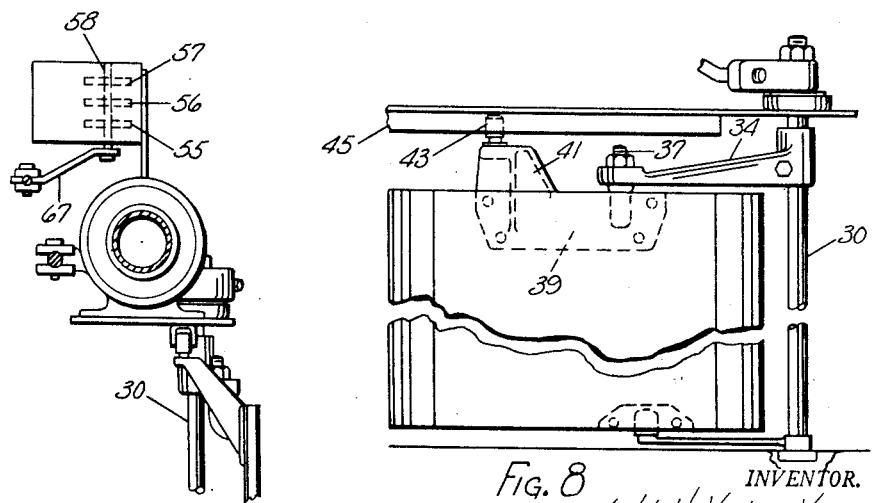
Fig. 7 is a transverse view along line 7—7 of Fig. 5.
Fig. 8 is an elevation view of one of the doors of Fig. 6, and the operating connections thereto.

In Figs. 1 and 2 the operating motor armature is shown at 15, the field coils at 16, 17, 18, and 19, and the motor translating screw-shaft at 20, the latter carrying at one end a reciprocating assembly including a pair of circular coupling elements 21, 22 one of which has an apertured extension 23 to receive a link 24 (Fig. 5) forming part of a linkage 24—28 for rotation of the two vertically disposed shafts 29, 30 (Figs. 6-8) whose rotation swings the doors 31, 32 (Fig. 6) from one to the other of their two extreme positions; the closed positions being indicated in full lines and the open positions in broken lines. Arms 33, 34 connect shafts 29, 30 with doors 31, 32 respectively, the said arms having enlarged apertured ends for pivotal connection with mounting posts 36, 37 on the doors 31, 32 respectively. These posts 36, 37 are secured in sockets formed in plates 38, 39 fastened to the doors. Each plate also has a triangular projection (40, 41) carrying a roller (42, 43) bearing against the side walls of a track 45 to control the arc described by each door as it swings with the actuating arms 33, 34; the arrangement being such that the doors swing about constantly varying pivot locations and do not at any stage of their movement encroach upon the main passage area lying just above the track 45, as viewed in Fig. 6.

Reverting to the motor construction, the field coils 16—19 are connected in series, and also are connected in series with the armature winding (see Fig. 9) through the two armature brushes 50, 51 (only one of which is shown in Fig. 1); the armature winding being in two parallel, wave-wound sections 52, 53, so that the voltage drop across the brushes 50, 51 is only about one-half of what it would be if the entire armature winding were in a single, undivided circuit. Also, the number of conductors in each armature slot is relatively small in comparison with the number of turns of wire in each of the field coils 16—19, so that there is a preponderance of ampere turns in the field and therefore the greater part of the heat generated by the motor in action is generated in the outer (field) section of the machine where it can be directly transferred to the outer shell 54 where it is readily dissipated.

The novel control circuits above referred to include switches 60—61, 62—63, and 64—65 actuated by three discs 55, 56 and 57 respectively (see Figs. 5 and 7) carried on a rock-shaft 58 that rotates between two limit positions as the door is moved by the linkage above described; the said linkage including a crossbar 59 (Fig. 5) actuating a rod 66 and a lever 67 (Figs. 5 and 7) to produce such rotation of the shaft 58. Figs. 10, 11, and 12 show schematically the degree of rotation of the shaft 58 between its two limit positions, and these figures also show how the rotation of the shaft 58 and the discs 55, 56 and 57 carried thereon, controls opening and closing movements of the switch fingers 60, 62, and 64; there being cam elements of varying extent mounted on the peripheries of the discs 55, 56, and 57 to actuate said switch fingers. Springs also connect with said fingers to yieldably oppose closing of the switches and to return them to their open positions when not engaged by their cams.

The novel control circuits also include adjustable resistance elements 71 and 72 (Fig. 9) and a relay having a winding 73 and armatures 74, 74a to engage terminals 76, 77 respectively, when no current is flowing in the winding 73 and to engage terminals 78, 79 respectively, when current is flowing. Flow of current to the relay occurs whenever manual switch 75 (Fig. 9) is closed, and ceases when switch 75 is manually opened.

The sequence of operations is as follows:

A. Door closed
B. Door opening
C. Door open
D. Door closing

These different conditions will be described in order.

A. Door closed

The contacts of the control switch 75 are open. This de-energizes the relay coil 73 and the relay contacts 76, 77 are closed. Contacts 62, 63 (Fig. 11) are open.

The path of current flow is from the battery through the field coils 16—19, through resistance 81 to closed contact 77 and thence to the motor armature and through its coils 52—53 to closed contact 76 and thence to ground 83.

This develops a torque in the motor in the proper direction for holding the door firmly in closed position without need of mechanical locks.

B. Door opening

The control switch 75 is manually closed, completing a circuit through the relay coil 73 from battery to ground. The relay coil reverses the relay contacts, causing contacts 78, 79 to close and reverse the direction of current flow to the armature, which reverses the motor. Contacts 64, 65 are also closed as shown in Fig. 12, while contacts 60, 61 are open as shown in Fig. 10. This reverse path of current flow may now be traced from the battery, through the motor field coils, through the closed contacts 64, 65 to contact 78 of the reversing relay. As contact 78 is closed the current passes through the motor armature in the opening direction, thence through closed contact 79 to ground 84.

As the door is moved toward its open position, it is desirable that it be cushioned to prevent slamming. This is accomplished by the action of the cam switch shown in Fig. 10, causing contacts 60, 61 to close completing a shunt circuit by way of conductor 86 to partially short circuit the armature through the adjustable resistance 71 and thence through closed contact 79 to ground 84.

Contacts 60, 61 are preferably closed from the 67½° position to 82½° position during the door opening cycle (see chart, Fig. 13).

When the door reaches the nearly full open position preferably indicated as 85° on the chart, Fig. 13, cam switch contacts 60, 61 and 64, 65 are opened.

The current then passes through resistance 82 to contact 78 of the relay. The relay continues the circuit through the motor armature in the opening direction to closed contact 79 and thence to ground 84.

C. Door open

As the door reaches the full 90° opening position and stops, the flow of current through the fields 16—19, resistance 82 and armature, develops sufficient torque in the motor to be effective in holding the door firmly in the full open position without the need of mechanical locks.

D. Door closing

Control switch contacts 75 are manually opened, which de-energizes the relay coil 73. The relay then reverses its contacts, reversing the flow of current to the motor armature, which reverses the motor and causes the door to move toward the closed position.

The circuit now extends from the battery, through the field coils and closed contacts 62, 63 along conductor 90 to closed contact 77 of the relay, thence through the armature in a door closing direction, through closed contact 76 to ground 83.

As the door reaches a nearly closed position, preferably at the 5° position, cam switch in Fig. 11, opens contacts 62, 63 (which had previously been held closed) and brings resistance 81 into the circuit.

As the door reaches the fully closed position and stops, the flow of current through the fields 16—19 resistance 81 and the armature develops sufficient torque in the motor to be effective in holding the door firmly in the fully closed position without the need of mechanical locks.

In further reference to paragraphs "A" and "D", the circuits therein traced are supplemented by an auxiliary circuit running to the adjustable resistor 72, in parallel with the armature circuit. Because of this auxiliary parallel circuit, the current is divided between the armature and resistor 72, hence the door closing torque developed in the motor is less than the door opening torque, and as a consequence the door does not acquire as much momentum in closing as it does during the opening movement. This differential as between opening and closing momentum is desirable as it assures maximum saving of time in opening the door, with minimum risk during door closing; the closing momentum being lessened and therefore the possibility of inflicting injury, even in contact with the body of a passing person, being correspondingly reduced.

The novel lubricating means includes an element taking the form of a three-bladed distributor 87 secured to the outer screw element 88, and rotatable therewith; the element 88 being a part of the motor armature assembly. As distributor 87 rotates with this assembly, its three blades pick up oil from reservoir 89 and deposit it on the surfaces of the inter-engaged screw threads and other parts requiring lubrication. Oil for reservoir 89 is supplied through supply passage 91, and may be drained off, during cleaning operation, by way of drain passage 92. Oil passages 93—94 permit inspection and regulation of the oil level.

The novel lubricating means for the screw chamber also includes an annular wick 95 of soft, flexible material fitting within a groove cut by the periphery of the coupling element 21 and adapted to pick up oil in capillary fashion, from the inner surface of the cylinder 14 as the coupling assembly moves from one limit of travel to the other. As the coupling element 21 is also provided with a longitudinally extending recess or groove to receive and cooperate with the longitudinal guide strip 13 by which the coupling assembly and screw 20 are constrained against rotary movement, the annular wick 95 is interrupted in its continuity so that it may, in effect, straddle the said guide strip 13, in such a manner that the adjacent end faces of the wick brush lightly along the opposite vertical sides of the strip and thereby maintain a completely lubricated condition throughout the operation.

What I claim is:

1. A system for controlling the operation of a door or the like driven by an electric motor, said system comprising a source of D. C. power, a reversible D. C. motor operatively connected to a door or the like to open and close the latter and having an armature through which current may pass in opposite directions to reverse the direction of rotation of said motor, and electrical connections between said power source and said armature including a directional switch and a resistor connected between one end of said armature and ground, said directional switch connecting said one end of said armature to ground and the other end of said armature to said D. C. power source for one direction of rotation of said motor, said resistor thus being shorted into ineffectiveness, and reversing said connections between said armature and said D. C. power source for the other direction of rotation for said motor, said resistor thus being in parallel with said armature.

2. In the system of claim 1, a second resistor connected between said D. C. source and said one end of said armature via a second switch operatively connected to said door and actuated in accordance with the position thereof, and a third resistor connected between said D. C. source and the other end of said armature via said directional switch when the latter is actuated for rotation of said motor in said one direction, said third resistor being bypassed by a third switch operatively connected to said door and actuated in accordance with the position thereof, said second switch being closed only during an intermediate range of movement of said door short of the beginning and end thereof, said third switch being closed during movement of said door in said one direction from the beginning thereof to a point close to the end thereof.

3. In the system of claim 2, a fourth resistor connected between said D. C. source and said one end of said armature via said directional switch when the latter is actuated for rotation of said motor in said other direction, said fourth resistor being bypassed by a fourth switch operatively connected to said door and actuated in accordance with the position thereof, said fourth switch being closed during movement of said door in said other direction from the beginning thereof to a point close to the end thereof.

4. A system for controlling the operation of a door or the like driven by an electric motor, said system comprising a source of D. C. power, a reversible D. C. motor operatively connected to a door or the like to open and close the latter and having an armature through which current may pass in opposite directions to reverse the direction of rotation of said motor, and electrical connections between said power source and said armature including a directional switch connecting one end of said armature to ground and the other end of said armature to said D. C. power source for one direction of rotation of said motor and reversing said connections for the other direction of rotation of said motor, a first resistor connected between said D. C. source and said one end of said armature via a first switch operatively connected to said door and actuated in accordance with the position thereof, and a second resistor connected between said D. C. source and the other end of said armature via said directional switch when the latter is actuated for rotation of said motor in said one direction, said second resistor being bypassed by a second switch operatively connected to said door and actuated in accordance with the position thereof, said first switch being closed only during an intermediate range of movement of said door in said one direction short of the beginning and end thereof, said second switch being closed during movement of said door in said one direction from the beginning thereof to a point close to the end thereof, and a third resistor connected between said D. C. source and said one end of said armature via said directional switch when the latter is actuated for rotation of said motor in said other direction, said third resistor being bypassed by a third switch operatively connected to said door and actuated in accordance with the position thereof, said third switch being closed during movement of said door in said other direction from the beginning thereof to a point close to the end thereof.

5. A system for controlling the operation of a door or the like driven by an electric motor, said system comprising a source of D. C. power, a reversible D. C. motor operatively connected to a door or the like to open and close the latter and having an energized component through which current may pass in opposite directions to reverse the direction of rotation of said motor, and electrical connections between said power source and said component including a directional switch and a motor-speed-modifying circuit element connected between one end of said component and ground, said directional switch connecting said one end of said component to ground and the other end of said component to said D. C. power source for one direction of rotation of said motor, said component thus being shorted into ineffectiveness, and reversing said connections between said component and said D. C. power source for the other direction of rotation of said motor, said element thus being in parallel with said component.

6. In the system of claim 5, a second motor-speed-modifying circuit element connected between said D. C. source and said one end of said component, said second element being operatively associated with a second switch operatively connected to said door and actuated in accordance with the position thereof, actuation of said second switch being effective to associate said second element with said component in a sense to reduce the speed of operation of said motor, and a third motor-speed-modifying circuit element connected between said D. C. source and said other end of said component via said directional switch when the latter is actuated for rotation of said motor in said one direction, said third element being operatively associated with a third switch operatively connected to said door and actuated in accordance with the position thereof, actuation of said third switch being effective to associate said element with said component in a sense to reduce the speed of operation of said motor, said second switch being actuated during an intermediate range of movement of said door in said one direction short of the beginning and end thereof, said third switch being deactuated during movement of said door in said one direction from the beginning thereof to a point close to the end thereof and actuated during the remainder of said movement.

7. In the system of claim 6, a fourth motor-speed-modifying circuit element connected between said D. C. source and said one end of said component via said directional switch when the latter is actuated for rotation of said motor in said other direction, said fourth circuit element being operatively associated with a fourth switch operatively connected to said door and actuated in accordance with the position thereof, actuation of said fourth switch being effective to associate said element with said component in a sense to reduce the speed of operation of said motor, said fourth switch being de-actuated during movement of said door in said other direction from the beginning thereof to a point close to the end thereof and actuated during the remainder of said movement.

8. A system for controlling the operation of a door or the like driven by an electric motor, said system comprising a source of D. C. power, a reversible D. C. motor operatively connected to a door or the like to open and close the latter and having an energized component through which current may pass in opposite directions to reverse the direction of rotation of said motor, and electrical connections between said motor source and said component including a directional switch connecting one end of said component to ground and the other end of said component to said D. C. power source for one direction of rotation of said motor and reversing said connections between said component and said D. C. power source for the other direction of rotation of said motor, said connections further including a first motor-speed-modifying circuit element connected between said D. C. source and said one end of said component, said first circuit element being operatively associated with a first switch operatively connected to said door and actuated in accordance with the position thereof, actuation of said first switch being effective to associate said first element with said component in a sense to reduce the speed of operation of said motor, a second motor-speed-modifying circuit element connected between said D. C. source and said other end of said component via said directional switch when the latter is actuated for rotation of said motor in said one direction, said second element being operatively associated with a second switch operatively connected to said door and actuated in accordance with the position thereof, actuation of said second switch being effective to associate said element with said component in a sense to reduce the speed of operation of said motor, said first switch being actuated during an intermediate range of movement of said door in said one direction, short of the beginning and end thereof, said second switch being de-actuated during movement of said door in said one direction from the beginning thereof to a point close to the end thereof and actuated during the remainder of said movement, a third motor-speed-modifying circuit element connected between D. C. source and said one end of said component via said directional switch when the latter is actuated for rotation of said motor in said other direction, said third element being operatively associated with a third switch operatively connected to said door and actuated in accordance with the position thereof, actuation of said third switch being effective to associate said third element with said component in a sense to reduce the speed of operation of said motor, said third switch being deactuated during movement of said door in said other direction from the beginning thereof to a point close to the end thereof and actuated during the remainder of said movement.

References Cited in the file of this patent

UNITED STATES PATENTS

| Number | Name | Date |
|---|---|---|
| 335,781 | Sprague | Feb. 9, 1886 |
| 673,564 | Morrison | May 7, 1901 |
| 1,129,391 | Hohne et al. | Feb. 23, 1915 |
| 1,274,433 | Mix | Aug. 6, 1918 |
| 1,405,315 | Moore | Jan. 31, 1922 |
| 1,453,532 | Stephens | May 1, 1923 |
| 1,674,605 | Mortensen | June 19, 1928 |
| 1,766,001 | Planche | June 24, 1930 |

(Other references on following page)

UNITED STATES PATENTS

| Number | Name | Date |
|---|---|---|
| 1,819,697 | Boudette | Aug. 18, 1931 |
| 2,034,415 | Parvin | Mar. 17, 1936 |
| 2,076,499 | Grant | Apr. 6, 1937 |
| 2,149,575 | Bundy | Mar. 7, 1939 |
| 2,173,475 | Forman | Sept. 19, 1939 |
| 2,193,642 | Parvin | Mar. 12, 1940 |
| 2,264,845 | How | Dec. 2, 1941 |
| 2,275,643 | Norton et al. | Mar. 10, 1942 |
| 2,297,719 | Satterlee | Oct. 6, 1942 |
| 2,319,661 | Conway | May 18, 1943 |
| 2,326,320 | Bales | Aug. 10, 1943 |

OTHER REFERENCES

Blalock: "Direct Current Machinery," 1947, pp. 38 to 50, McGraw-Hill Book Co.

Hehre and Harness: "Electrical Circuits and Machinery," vol. 1, Direct Currents, 1940, pp. 211 to 214, John Wiley and Sons.